(12) United States Patent
Lanz et al.

(10) Patent No.: US 9,308,712 B2
(45) Date of Patent: Apr. 12, 2016

(54) APPARATUS AND METHOD FOR MANUFACTURING TEAR-OFF LIDS

(75) Inventors: Andreas Lanz, Bergdietikon (CH); Oliver Schulthess, Uster (CH); Peter Taina, Neuenhof (CH)

(73) Assignee: Soudronic AG, Bergdietikon (CH)

(*) Notice: Subject to any disclaimer, the term of this patent is extended or adjusted under 35 U.S.C. 154(b) by 300 days.

(21) Appl. No.: 14/007,027

(22) PCT Filed: Feb. 9, 2012

(86) PCT No.: PCT/CH2012/000034
§ 371 (c)(1),
(2), (4) Date: Dec. 9, 2013

(87) PCT Pub. No.: WO2012/129710
PCT Pub. Date: Oct. 4, 2012

(65) Prior Publication Data
US 2014/0083602 A1    Mar. 27, 2014

(30) Foreign Application Priority Data

Mar. 25, 2011 (CH) .................................... 0553/11

(51) Int. Cl.
| | |
|---|---|
| *B21D 51/44* | (2006.01) |
| *B32B 38/00* | (2006.01) |
| *B21D 51/38* | (2006.01) |
| *B65D 17/50* | (2006.01) |
| *B65D 51/20* | (2006.01) |
| *G04B 15/06* | (2006.01) |

(52) U.S. Cl.
CPC ............ *B32B 38/0012* (2013.01); *B21D 51/38* (2013.01); *B21D 51/44* (2013.01); *B21D 51/443* (2013.01); *B65D 17/502* (2013.01); *B65D 51/20* (2013.01); *G04B 15/06* (2013.01); *B65D 2517/5083* (2013.01); *Y10T 156/1049* (2015.01)

(58) Field of Classification Search
None
See application file for complete search history.

(56) References Cited

U.S. PATENT DOCUMENTS

| | | | |
|---|---|---|---|
| 3,380,622 A | 4/1968 | Garavaglia et al. | |
| 2010/0183406 A1* | 7/2010 | Gysi | B21D 51/38 413/14 |
| 2010/0276426 A1* | 11/2010 | Kleiner | B65D 17/502 220/378 |

FOREIGN PATENT DOCUMENTS

| | | |
|---|---|---|
| EP | 1386852 A1 | 2/2004 |
| EP | 2208554 A2 | 7/2010 |
| WO | 2006017953 A1 | 2/2006 |
| WO | 2006029991 A1 | 3/2006 |

OTHER PUBLICATIONS

International search report for PCT/CH2012/000034 dated May 3, 2012.

\* cited by examiner

*Primary Examiner* — Barbara J Musser
(74) *Attorney, Agent, or Firm* — McCormick Paulding & Huber LLP (57) ABSTRACT

In case of manufacturing tear-off lids (28) out of lid rings (20') with a tear-off foil (25) sealed on them and with a tear-off tab (29) the tear-off tab is fixed in a folded back position onto the tear-off foil of the lid by an adhesive patch (30). For this, the adhesive patch is applied onto the foil section in such a way that individual adhesive patches are separated out of an adhesive tape with a carrier tape and an adhesive material arranged thereon by a separating means. Such an adhesive patch is arranged on the foil section of each lid in a position where the folded back tear-off tab comes to lie. By this, a fixing of the tear-off tab can be reached in an economical and secure manner.

11 Claims, 5 Drawing Sheets

APPARATUS AND METHOD FOR MANUFACTURING TEAR-OFF LIDS

CROSS REFERENCES TO RELATED APPLICATIONS

This application claims the priority of Swiss patent application no. 00553/11, filed on Mar. 25, 2011 and claims the benefit of PCT Application No. PCT/CH2012/000034, filed on Feb. 9, 2012, the entire disclosures of which are hereby included by reference.

Technical Field

The invention relates to an apparatus for manufacturing tear-off lids. Furthermore, the invention relates to a method for manufacturing tear-off lids.

Background Art

It is known how to provide lids for can-like or tin-like packages as metal lids which are permanently attached on the top side of the packages, having a lid ring with an extraction opening. The extraction opening remains closed by means of a peelable foil until the first use. This foil is attached to the lid ring by heat sealing. Such lids are called tear-off lids or peel-off lids respectively. The foil on the lid is called tear-off foil and may i.e. be a metal foil, a metal composite foil or a pure plastic foil. An additional plastic lid arranged above the metal lid makes it possible to close the package during the time of consumption of its contents. The tear-off foil has a tear-off tab for manually opening the tear-off lid by tearing off the sealed foil. During the production of lids and after the sealing process the tear-off tab is folded back in a direction towards the top side of the tear-off foil or the top side of the lid, respectively, such that it comes to lie on the sealed foil. Before such a lid on a closed container with a product contained therein reaches the end user further steps are necessary, like stacking of the lids, storing the lids, destacking of the lids, closing a container with a lid, washing, sterilizing (up to 130 degrees Celsius), washing again, attaching labels, packaging. During these steps the tear-off tab faces the danger of being damaged, such that it can no longer be of use for the end user. On the other hand, a tab which departs from the folded position or which straightens up can disturb said steps, i.e. the closing process of the container with the lid. For example the pre-manufactured tear-off lid is beaded to the body of the can. During this production step, a protruding tear-off tab may disturb this step, it may crumble and it may even be torn off. It is therefore desired that the tear-off tab is folded back onto the lid during lid production and that it keeps this position until the container with the lid has reached the end user. A simple folding back is possible, without additional measures, in case of metal foils, however, even in case of such foils, the heat influence and the cooling process during the sterilization of the filled and closed can may cause a deformation of the tear-off foil and an undesired standing up of the tear-off tab. In case of composite foils made of metal and plastic, or foils made only of plastic, a permanent folding back onto the top side of the tear-off foil is more difficult and it is more likely that a standing up results during sterilization because of different thermal expansions of the layers. For cans receiving dry products, which do not have to be sterilized, it is already known to fix the folded back tear-off foil with hotmelt-glue onto the lid after sealing the tear-off foil onto the lid. However, this production step is complex. It is additionally not suitable for cans to be sterilized because hotmelt-glue can fail under the sterilization conditions.

It is known from EP-A 2 208 554 how to apply a piece of double sided adhesive tape as adhesive surface onto the lid ring before the tear-off foil section is punched out for the lid and thereby before sealing the tear-off foil onto the lid ring. This adhesive surface is protected by a protective foil during the sealing, which then has to be removed before folding back the tear-off tab. EP-A 1 386 852 shows a similar procedure with applying an adhesive tape or by heat sealing the tear-off tab. WO-A 2006/029991 shows the attachment of the tear-off tab by heat sealing.

Known methods or devices respectively for manufacturing tear-off lids are explained in more detail below by means of FIGS. 1 to 9. Thereby, FIGS. 2 to 8 serve for explaining manufacturing steps.

SUMMARY OF THE INVENTION

It is the objective of the invention to provide an improvement for an apparatus for manufacturing tear-off lids, thus leading to an easily usable and reliable attachment of the tear-off tab on the lid. This improvement shall be reliably usable for the manufacturing with a high production rate of 200 or more lids per minute.

In order to reach this objective a processing station for adhesive bonding is provided between the sealing station and the folding station of the apparatus, having an application device by means of which an adhesive tape is transported and an patch of adhesive is removed from a carrier tape of the adhesive tape, which adhesive patch can be applied in the station for adhesive bonding onto the top side of the foil section, which was previously sealed onto the lid ring, in a position where the tear-off tab will come to lie in the folding station.

Applying an adhesive patch, or in other words a piece of the adhesive film, in the apparatus after sealing the tear-off foil on each lid ring, thus on the already formed lid, in a subsequent processing station of the apparatus, by providing and applying a single adhesive patch from an adhesive tape, avoids the need for a protective foil above the adhesive surface, because the folding back of the tear-off tab is executed in the next step or in one of the next steps directly within the apparatus. By providing the adhesive patches by means of a transported adhesive tape it is possible to provide a high-speed lid-synchronous supply.

It is possible that the adhesive tape already is provided with a series of adhesive pads or patches, respectively, separated from each other, which are applied one after another onto the lids following each other. It is however preferred that the application device has a separating means which is arranged and constructed such that individual adhesive patches which are separated from one another can be formed out of an adhesive material or adhesive film, respectively, arranged continuously on the carrier tape. Then these patches can be applied one after the other onto the lids following each other. The forming of the separated adhesive patches on the adhesive tape by the application device simplifies the synchronisation between the forming of the lid and the supply of the adhesive patches in the station for adhesive bonding. Preferably, a separating blade is provided as separating means, which can be controllably deflected towards a pressure plate, wherein a path for the adhesive tape is provided between the separating blade and the pressure plate. By this, the adhesive tape or its adhesive film, respectively, which is transported through the path can be reliably divided into individual adhesive patches on the carrier tape (liner) of the adhesive tape.

The carrier tape is not cut off while the adhesive film is cut. A preferred heating of the separating means, i.e. to a value of 200 degrees Celsius up to 250 degrees Celsius, avoids a soiling of the separating means or the blade, respectively, by the adhesive and improves the separation of the adhesive film into individual adhesive patches or pads, respectively, which are clearly separated from each other by the separating means. The separation of the adhesive patches does not necessarily require a complete separation of subsequent adhesive patches, even though this is preferred. It has been found out that a separation to an extent less than the full film thickness is also sufficient to provide a rupture of the adhesive film between neighbouring adhesive patches when subsequently providing the patches.

Furthermore it is preferred that the application device has a deflector for the transported adhesive tape in order to provide for the individual adhesive patches, which is arranged after the separating means in transport direction and which deflects the adhesive tape about around 90° and particularly such that it comes to lie in a substantially horizontal position, and in that the station for adhesive bonding is formed in such a way that the respective lid to be provided with the adhesive surface can be moved towards the deflector plane and can be pressed against the latter. This makes it possible to apply the adhesive patch onto the lid in a simple and fast way or to take over the adhesive patch from the application device onto the lid surface in the station for adhesive bonding synchronously with the other processing stations of the apparatus, and by the same kind of lid movement as in other processing stations (lift from and lay back onto the transport means or its lid trays) respectively, such that no slow down of the lid manufacturing occurs because of applying the adhesive patches. Preferably it is provided that an interruption of the transport of the adhesive tape occurs or the provision of an adhesive patch is disrupted, respectively, if it is determined that no lid is present in the lid tray of the processing station.

Preferably, the adhesive tape is used in form of a roll. The adhesive tape is a known so-called transfer adhesive tape in case of which the adhesive film can be removed from the carrier tape and is then usable by itself. It is therefore preferred that the application device has a roll holder for an adhesive tape roll or reel, respectively, and a deflecting roller arranged in order to rest on the circumferential side of the adhesive tape roll. The deflecting roller, which lies on the outer side of and thus on the carrier tape of the adhesive tape roll and can additionally preferably have a non-adhesive coating (i.e. a silicon coating) or can be made of such a material, makes it possible to peel off the adhesive tape from the roll without the occurrence that the adhesive film forms adhesive threads which could cause a soiling of the application device or the station for adhesive bonding respectively.

A contamination and a secure transport is furthermore made possible by preferably using an actuation means for the transport of the adhesive tape, which is arranged and formed in such a way that it acts only upon the carrier tape after the removal of the adhesive patches. Acting on the adhesive tape by the transport means is therefore preferably carried out after the deflection position following the separating means, by acting upon the carrier tape, which is non-adhesive, left over after the removal of the adhesive film from the tape. The carrier tape may be transported between actuation rollers. The actuation or transport respectively of the adhesive tape is done stepwise according to the synchronization requirements of the processing station, i.e. by means of a step motor actuation or a servo motor actuation or a pneumatic actuation.

A fault-free operation or the avoiding of defective lids without adhesive surface for the tear-off tab can be assured also in case of reaching the end of the adhesive tape roll and/or in case of rupture of the adhesive tape when the installation comprises detection means for reaching the end of the adhesive tape and/or a rupture of the adhesive tape as well as preferably braking means acting upon the adhesive tape taken from the roll but before the tape reaches the separating means. This enables the transport of the adhesive tape which, in such cases, isn't slowed down anymore by the adhesive tape spool, with the necessary tape tension for a correct separation by the separating means until the apparatus is switched off.

A further objective is to provide a method for manufacturing tear-off lids, which results in a secure attachment of the tear-off tab onto the lid in a simple way.

BRIEF DESCRIPTION OF THE DRAWINGS

In the following, the prior art and embodiments of the invention are described in more detail by means of the figures.

DESCRIPTION OF THE PREFERRED EMBODIMENTS

Figure 1:
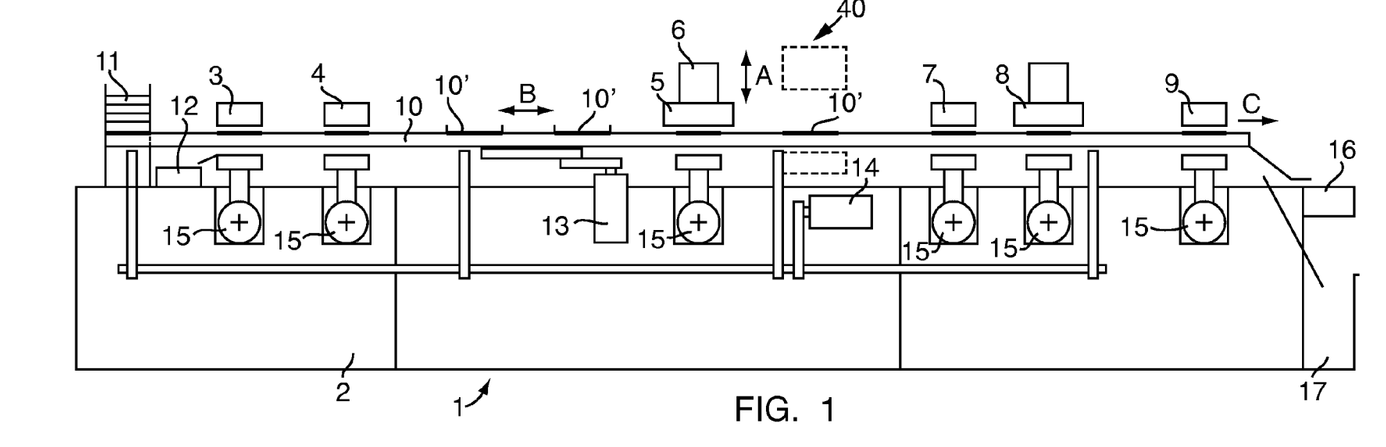
FIG. 1 is a schematic lateral view of an apparatus according to the prior art as well as for carrying out the present invention.

FIG. 1 shows a schematic side view of a apparatus 1 for manufacturing tear-off tabs. It has a plurality of processing stations 3 to 9 on a machine frame 2. If the apparatus is formed according to the invention it further has a processing station for adhesive bonding 40 which is denoted in the figure and which will be described in more detail. A transport device transports lid parts and the finished lids incrementally in transport direction which is denoted by the arrow C, from the beginning of the apparatus at the stack 11 up to the end of the apparatus where the lids get into the deposits 16 or 17 via slides.

Within the scope of the present invention the transport device can be formed arbitrarily. Preferably, a transport device known to the skilled person is used, having two toothed belts or synchronous belts, respectively, and trays for the lid parts and lids arranged on them according to WO 2006/017953. Such an endless toothed belt actuator is provided with the length necessary for the number of processing stations and the stepwise motion of the toothed belt, which is synchronized with the processing stations, is done by a step motor or servo motor. The transport device with toothed belts allows the manufacturing of lids with a high cycle time of i.e. 200 lids per minute.

The transport device shown in FIG. 1 is of another common type which is also usable. Lid parts are destacked from the stack 11 in a known way and get into the transport device 10, 13, 14. The latter may have two long bars 10, each of which is arranged at the side of the objects and lift up the lid parts or the lids respectively lying on the trays 10' or in the stations 3 to 9 respectively, during their own lift up, in the direction of arrow A, by means of the actuator 14, and subsequently shift them onwards by an amount in a forward motion in the direction of arrow B (in the same direction as arrow C) by means of the crank drive 13. Thereafter, the bars are moved downwards in the direction of arrow A, wherein the lid parts or the lids respectively are again placed onto their lay-down position. Thereafter, the bars 10 are moved backwards below the object lay-down positions in the direction of arrow B and anti-parallel to arrow C, whereafter the described process is repeated. Between transportations, the lid parts or the lids respectively lie on their lay-down positions or are located in the processing stations respectively and are processed there, in the course of which they are particularly lifted up by the processing station, processed and laid down in the lay-down positions. This is also valid in case of a transport of the lid parts and lids with the mentioned tooth belts. After a processing step through all processing stations a transport is carried out again.

Figure 2:
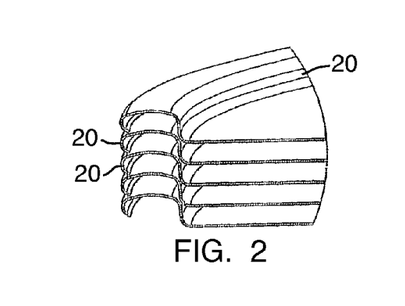
FIG. 2 to FIG. 8 are sectors of metal lids for explaining their manufacture.

FIG. 2 shows stacked metal lid blanks 20, as they are provided in the stack 11 at the beginning of the transport device. These blanks 20 are for example round metal disks with a diameter of for example 11 cm. Evidently, other basic shapes like for example square or rectangular disks and other diameters are readily possible. The blanks 20 have already been preformed at their edges as shown in FIG. 2 in a processing machine which is not shown. In FIG. 2 and in the subsequent FIGS. 3 to 9, only a sector of the whole disk or lid respectively is shown in order to simplify the figures.

Figure 3:
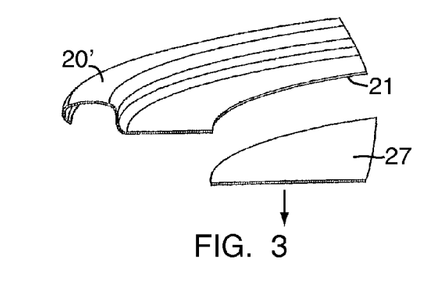
Figure 4:
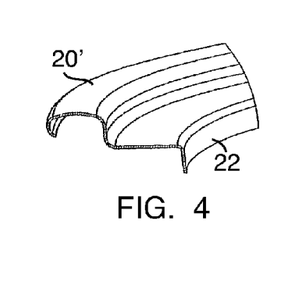
Figure 5:
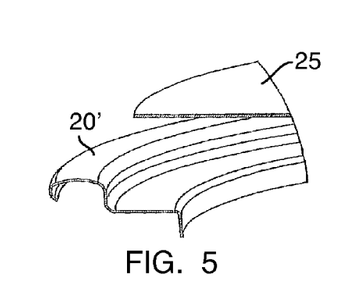
Figure 6:
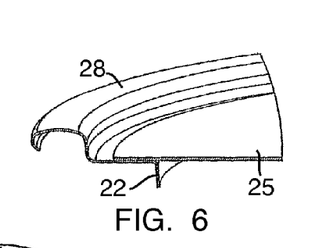
Figure 7:
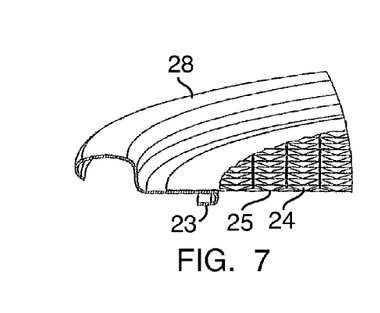
Figure 8:
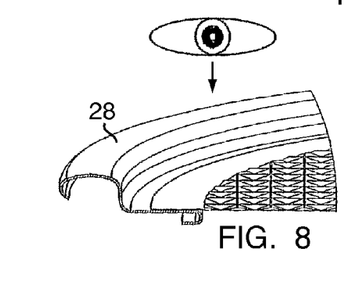

In the first processing station 3 of FIG. 1, an opening is stamped into the disk by means of a stamping process with an upper and a lower tool, this being shown in FIG. 3, wherein the edge of the opening is denoted by 21 and the stamped out round disk by 27. This disk 27 is disposed of in the container 12 of FIG. 1. Thus, the result is a ring shaped lid part or lid ring 20' respectively with an opening which forms the extraction opening of the finished lid. The stamp processing station 3 is actuated—as it is the case for the additional processing stations—by means of an actuator 15. A pulling down of the edge 21 takes place in the processing station 4, by means of which for example the shape 22 of the edge, shown in FIG. 4, is reached.

Then the lid rings 20' reach the sealing station 5. It may also be provided that the lid parts are processed turned by 180 degrees before the sealing station and that a turning station is arranged before the sealing station, which turns the lid rings. In the sealing station 5 a foil section 25 is stamped out by means of stamping means 6 and placed above the opening of the lid ring 20' and attached there by means of heat sealing, this being shown in FIGS. 5 and 6. The tear-off foil 25 which may be a metal foil or a composite foil or a plastic foil, has a sealable plastic layer on its underside. The tear-off foil 25 may for example be a multiple layer composite foil with plastic layers and aluminium layers and may for example have a layer of heat sealable polypropylene (PP) and a subsequent layer of PET, being followed by an aluminium layer and having another PET layer on the upper side of the tear-off foil. A possible printing is arranged under this PET layer. A further embodiment of the tear-off foil may be a heat sealing paint layer arranged under the lid or on the contents side respectively, being followed by the aluminium layer and the PET layer on the upper side of the lid. Also further embodiments are known to the skilled person and may be used within the scope of the present invention. The needed precut foil 25, which in this example has a round shape, is normally stamped out of a wide foil web in the station 5, 6, and placed above the middle cavity of the ring shaped disk, wherein the foil is pressed by the sealing station at the edge of the round cavity of the lid part 20' under the influence of heat, such that the foil 25 is sealed tightly by melting and subsequent cooling the sealable layer. A two-stage sealing step with pre-sealing and main sealing may also be used. This is known and will not be explained here in more detail. By this, the tear-off lid 28 is formed.

Because the present invention relates to an apparatus for manufacturing a tear-off lid with a tear-off tab, a folding station 7 is furthermore provided, inside which the tear-off tab of each lid is folded back, such that it comes to lie on the lid. Such folding stations are known and the acting upon the tear-off tab, i.e. by mechanical means and/or pressurized air, for folding them back are not further explained in the following. The foil 25 may be provided with formed structure 24 by stamping (FIG. 7) in the processing station 8 and then the edge 22 can subsequently be flanged to yield the finished edge 23, if this has not already been done in a previous processing station, i.e. before said turning station. The finished lids are submitted to an inspection in an inspection station 9 which is to be considered a processing station, normally comprising a leak test for the tear-off foil 25 which is applied on the lid. If the foil is tightly attached to the lid ring, the lid thereby ends up in the tray 16 for the finished lids. If a leak is detected, the lid ends up in the waste container 17 via the other shown slide.

Figure 9:
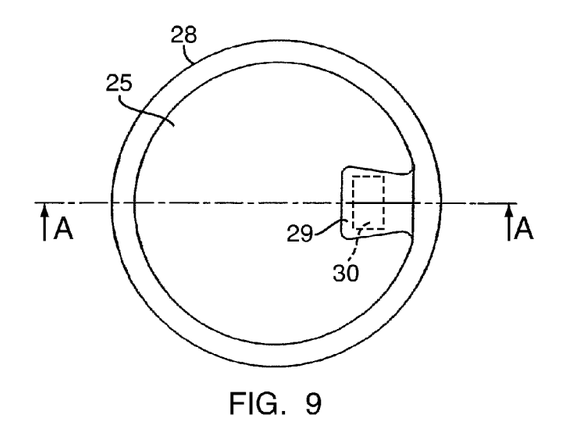
FIG. 9 is a top view on a tear-off lid according to the invention.
Figure 10:
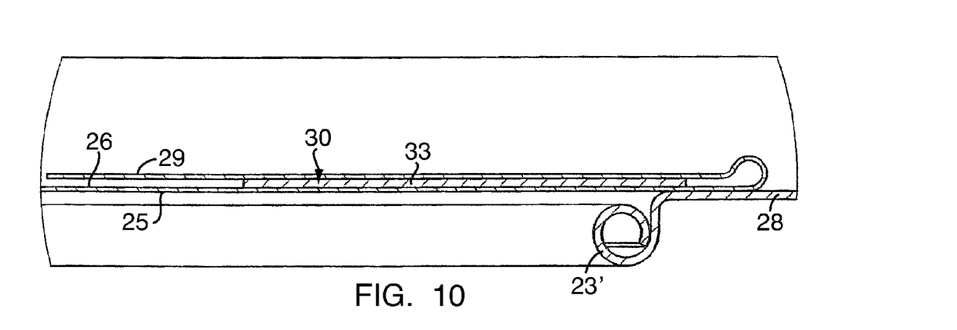
FIG. 10 is a partial section view of the tear-off lid of FIG. 9.

FIG. 9 shows a finished tear-off lid 28 in a top view. The tear-off foil 25 has a tear-off tab 29 which is folded back onto the lid. The tear-off tab is attached to the lid by means of an adhesive patch or pad 30, respectively, which is invisible in FIG. 9 because it lies below the tear-off tab; however it is denoted by a dashed line in the figure. According to the now following explanation of the way of providing the adhesive surface 30, it consists of a section of an adhesive film of a so-called transfer adhesive tape, which is applied onto the lid. The length of the adhesive patch, which in this example in FIG. 9 is rectangular, corresponds to the width of the adhesive tape. FIG. 10 shows a zoomed in cross section illustration of the tear-off lid with the tear-off tab 29, which is detachably attached to the adhesive patch 30 in the folded back position. The tab 29 extends beyond the adhesive patch 30, such that the tab can be easily gripped and peeled off from the adhesive patch or film 30, respectively, in order to open the tear-off lid. A transfer adhesive tape with an adhesive film on acrylic base is suitable for such an embodiment and is manufactured i.e. by the adhesive manufacturing company Tesa or the company 3M. In this example, the edge of the extraction opening has a different shape 23' than in FIG. 7.

FIG. 1 shows an apparatus for manufacturing tear-off lids which has already been described. According to the invention a station for adhesive bonding 40 is provided, with an application device 41 by means of which an adhesive tape can be transported stepwise and an adhesive patch which is detachable from a carrier tape of the adhesive tape can be provided, which can be applied, in the station for adhesive bonding, onto the upper side of the foil section which was sealed onto the lid ring beforehand at the position where the tear-off tab comes to lie in the folding station. The station for adhesive bonding can be adapted to only have elements above the transport means of the apparatus. In such an embodiment it is particularly suitable for retrofitting an existing apparatus. The application device 41 providing the adhesive patch applies in this case the adhesive surface onto the lid lying in an idle state on the transport means, i.e. in that the application device 41 presses the adhesive patch downwards onto the lid. In case of the station for adhesive bonding denoted in FIG. 1 an element of the processing station 40 is also provided underneath the transport means, such that the lid can be lifted up from its idle position onto the transport means, such that the lid is moved against the application device 41 of the processing station 40 arranged above the transport means in order to take over the adhesive patch. Thus, the result is a lid motion upwards like in other processing stations of the apparatus, particularly like in the sealing station. Therefore it is possible to enable the lid motion in the station for adhesive bonding by means of the same actuator which enables it in the sealing station. This also simplifies a retrofitting solution. On the other hand, the station for adhesive bonding can also be formed with an independent actuator, having an own actuator for lifting up the lid from the idle position in the transport means and thereby having a motion towards the installation. In terms of control, the station for adhesive bonding is however also in this case coupled to the control of the apparatus, such that the application of the adhesive surface is done synchronously with the other processing actions during the lid production.

Figure 11:
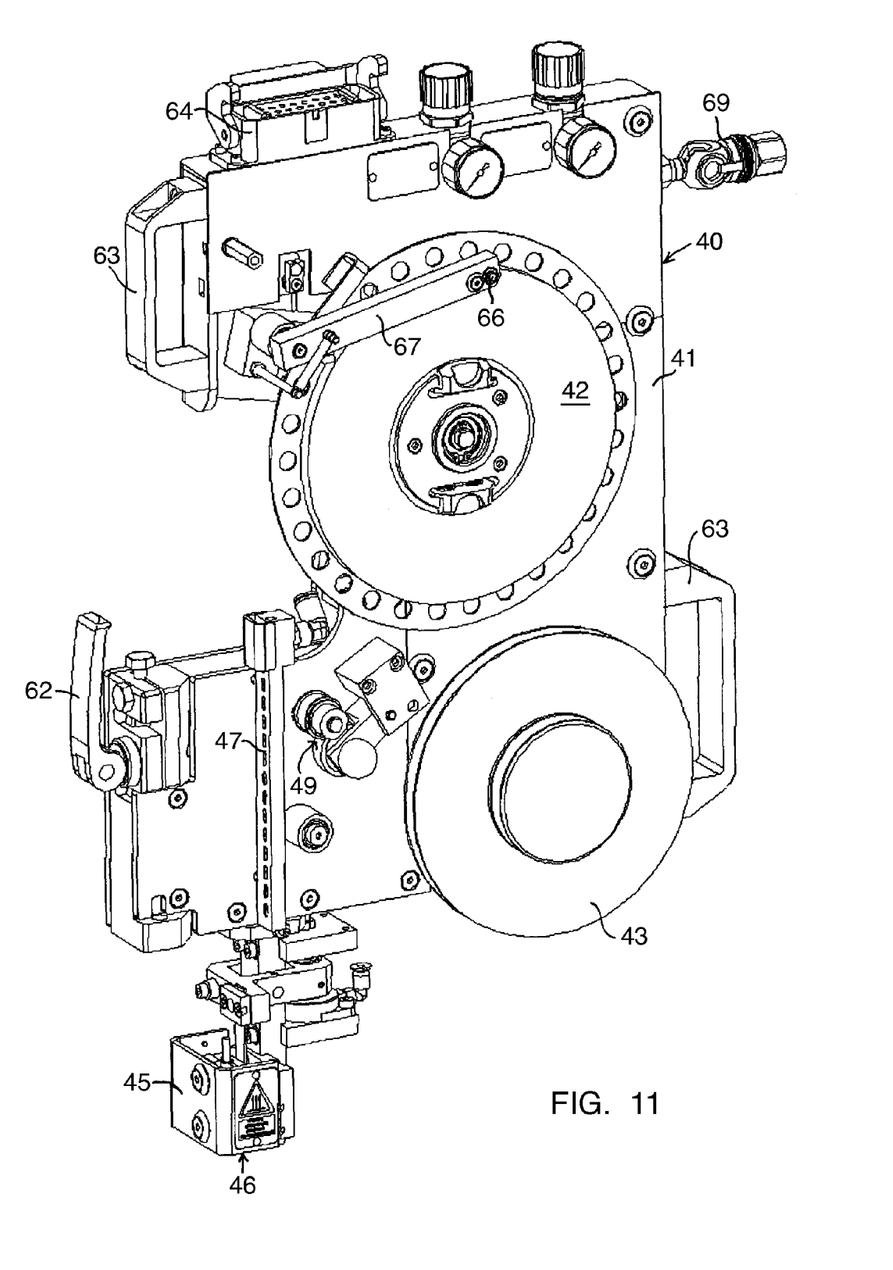
FIG. 11 is a perspective view onto the application device for forming the adhesive surfaces.
Figure 12:
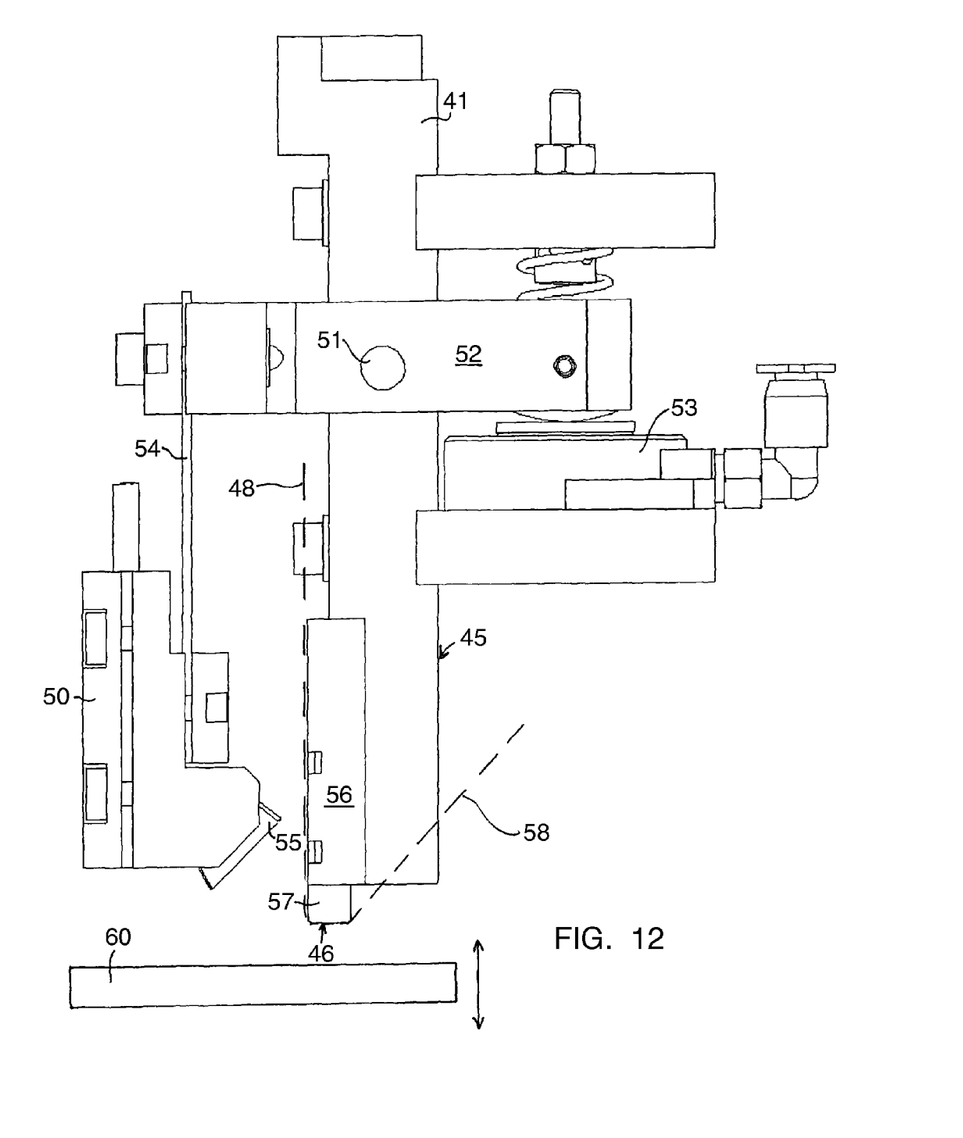
FIG. 12 is a side view on an embodiment of the separating means and the lid tray.

Preferred embodiments are explained in more detail by means of FIGS. 11 and 12. Thereby, FIG. 11 shows the application device 41 of the station for adhesive bonding 40. FIG. 12 shows in a broad schematic way a detail of this application device 41 as well as the element 60 of the processing station 40, which is located underneath the transport means.

The application device 41 of the station for adhesive bonding 40 is formed in the present example as an entity which can simply be attached in operation position above the transport means and can be detached, in order to remove it, by hand grips 63 and i.e. a clamping arrangement 62. Corresponding attachment rails or similar means have to be provided at the transport means of the apparatus, which are not shown here. This preferred embodiment allows a removal of the application device 41 when it is not needed, thus when i.e. lids without tear-off tabs are manufactured. Instead of this embodiment an application device 41 can also be provided mounted on the apparatus in a fixed way.

The application device 41 is preferably formed such that the transfer adhesive tape is held on the application device 41 as an adhesive tape roll or reel 42, respectively. For this, a roll holder which is not described in more detail is provided. The adhesive tape is taken off the adhesive tape roll. In FIG. 11 the unrolled tape is not shown and in FIG. 12 the taken off adhesive tape is only denoted by the dashed line 48. This is also valid for the carrier tape 58 of the adhesive tape after the removal of the adhesive film or the individual adhesive film sections or patches, respectively. The adhesive tape is guided from the adhesive tape roll via a deflecting roller which can only be seen with its axis 66 in FIG. 11 and which has a coating or is formed of a material respectively to which the adhesive material of the adhesive film does not adhere or adheres only poorly. This can be i.e. a silicon material. The deflecting roller is held by a lever 67 and adapted to the decreasing roll diameter in such a way that the deflecting roller always rests on the outer side of the adhesive tape roll 42. By this, a removal of the adhesive tape from its roll is possible without generating threads of adhesive. The adhesive tape roll 42 or the roll holder respectively is slowed down by a brake which is not described in more detail, in order to keep the removed adhesive tape under tension such that its course is defined. The removed adhesive tape gets into the separating means 45 of the application device 41 of the station for adhesive bonding 40. In the separating means 45 the continuous adhesive film of the transfer adhesive tape is divided in individual adhesive patches 30 such that they can be individually applied onto the lids. If alternatively the adhesive tape already has individual adhesive patches provided by the manufacturer of the tape instead of a continuous adhesive coating, then the separating means of the station for adhesive bonding 40 is obsolete. After the separation the individual adhesive patches are provided for appliance onto the lids.

This is preferably done by deflecting the adhesive tape after the separating means, this being shown in a schematic way in FIG. 11 by the tape application surface 46 on the underside of the separating means 45. By the deflection, on the one hand the isolated adhesive film section or the adhesive patch 30 can loosen itself at least partially from the carrier tape of the adhesive tape, or at least the subsequent loosening is simplified, and the adhesive patch 30 is brought in a position from where an isolated adhesive patch can be applied onto the lid. This can be done by lowering the entire application device 41 or preferably by a lift up of the lid in case of a stationary application device 41. Thereby, the carrier tape rests on the surface 46 and subsequently departs from the surface 46 without adhesive material.

The transport of the adhesive tape 48 is preferably done by means of an actuator which is arranged after, as seen in transport direction, the delivery position for the adhesive patch, because in this case there is practically no more adhesive material on the carrier tape. In the shown embodiment a roller actuator 49 is provided for the carrier tape. The rollers of this roller actuator are actuated i.e. by a step motor or a servo motor for pulling the adhesive tape stepwise according to the timing of the device or the processing stations respectively. The carrier tape can be disposed of after the roller actuator. This can be done in such a way that an actuated take-up reel 43 is provided for the carrier tape. The installation is provided with an electric interface 64 for the electric power supply and for electric control signals. Furthermore with a port for pressurized air 65 for the case of a pneumatically actuated separating means.

FIG. 12 shows the separating means 45 of the present embodiment and the deflection of the adhesive tape. In this embodiment of the separating means the adhesive tape 48 is guided between a mobile knife blade 55 which can be actuated and a pressure plate 56. The separating means formed as the blade 55 is arranged at a rocker 52 which is pivotable about the axis 51, being pivotable by means of an actuator, in this example by means of the pneumatic cylinder 53. By deflecting the pneumatic cylinder the separating means 55 is pressed against the pressure plate. The separating means is moved back by means of the spring shown above the pneumatic cylinder when the pneumatic cylinder is depressurized. An electric actuator can be used instead of the pneumatic cylinder, i.e. an electromagnet or a piezo-electric actuator. The pressure plate 56 is preferably attached in a freely pivotable way such that its surface situated in front of the knife blade 55 can orient itself parallel to the blade in order to carry out a straight cut through the adhesive film of the adhesive tape. Preferably, the separating means 55 is furthermore attached in a springy way in the separating direction; in the shown example by means of a leaf spring 54 which can pivot counter the separating direction. By this, the cutting force can be limited such that no damage of the carrier tape 58 occurs but only the adhesive film is cut. Furthermore it is preferred that the separating means is electrically heatable, i.e. to a temperature in the range of 200 to 250 degrees Celsius in order to support the separation of the adhesive material film and to avoid the contamination of the separating means with adhesive tape material. For this, an electric heating can be arranged in the carrier block 50 for the blade 55. Here, the deflector follows the separating means in transport direction, being formed as a nose 57 underneath the pressure plate. This nose forms the surface 46 on its underside. By the deflector an individual adhesive patch of the individual adhesive patches formed previously by the separating means can be brought in a position where this adhesive patch can be applied onto the lid. For this, the application device 41 or a part of it may be lowered onto the lid. As already explained it is however preferred that the lid is lifted up in the station for adhesive bonding and is pressed against the nose 57 in a preferably springy way, such that the individual adhesive patch 30 located there can be applied to the lid. A lid tray 60 of the station for adhesive bonding 40 is shown in FIG. 12, which can be lifted up in the direction of the arrow drawn there and again lowered. By lowering it, the lid with the adhesive patch 30 gets into tray of the transport means, which is not shown in FIG. 12, again, such that it can be transported further in the next step and thereby gets into the folding station 7 for the tear-off tab 29 which is applied onto the adhesive patch there. The deflection of the tape in the application device 41 is preferably done about around 90 degrees. However, a deflection about a sharp angle or a deflection about less than 90 degrees is also possible. Preferably, the adhesive tape is guided horizontally after the deflection in order to provide the adhesive patch for the vertically lifted lid.

The operation of the station for adhesive bonding 40 is done in such a way that the adhesive tape is transported stepwise into this processing station. After each step of the adhesive tape transport a separation of the adhesive material film is carried out on the tape 48 by the actuated separating means. This cuts only the adhesive material film and leaves the carrier tape 58 intact. The step length during the transport of the adhesive tape 48 determines the (therefore adjustable) width of the adhesive patch 30, the width of the adhesive tape 48 determines the length of the adhesive patch in case of the rectangular adhesive patch geometry of FIG. 9. During each step of the transport of the adhesive tape also an individual adhesive patch formed by the separating means out of the adhesive film is provided as such for applying it onto the lid. In the shown embodiment this is done by the deflection of the adhesive tape after the separating means, by means of which an adhesive patch which has previously been formed by it is positioned in such a way that it can be applied onto the lid or it can be taken over from the latter. Furthermore, the deflection supports the removal of the adhesive surface from the carrier tape. The stepwise operation of the station for adhesive bonding is synchronized with the other processing stations of the device, such that the separation of the adhesive material film and the provision and application of the adhesive surface occurs in time with the other processing stations of the device. However, for the separation it could be provided that it is carried out in the station for adhesive bonding outside said timing and only the provision of already separated adhesive patches is done synchronously.

The tape roll 42 is slowed down in normal operation mode by a brake in order to maintain a preset tension of the adhesive tape by actuator 49. Such brake means, no matter if they act upon the adhesive tape roll or on the roll holder mechanically or if they act electrically on the roll holder or they act in another way, are known to the skilled person and are not described in detail here. Furthermore, a monitoring for the adhesive tape stock is preferred, i.e. by mechanically detecting its circumference or by electrically monitoring the roller rotation rate over the time. In case the end of the adhesive tape is reached or in case of a rupture of the adhesive tape a further tape brake is preferably provided after the adhesive tape roll and directly before the separating means 45 in order to maintain the tape tension for a certain residual length of the adhesive tape and thereby to ensure a correct appliance of adhesive patches onto the lids until a stop of the apparatus. In case of the application device 41 shown in FIG. 11 this tape brake is executed as vacuum rail 47 which pulls the tape by means of vacuum against the rail surface and thereby slows it down. This braking may be continuously active and provided in addition or alternatively to the slowing down of the roll 42. In case of tape rupture or of reaching the tape end the braking can be increased. This braking can however also be inactive in normal operation and only be activated for the case of reaching the end or of a tape rupture. The adhesive tape end or its rupture is determined by optical and/or mechanical and/or electric detection means known to the skilled person and signalled to the control of the device of the station for adhesive bonding, if the latter has an own control, or preferably to the control of the apparatus, i.e. via the mentioned electric interface 64, such that the control can interrupt the production of lids in case of an adhesive tape end or a rupture.

In case of the production of tear-off lids 28 out of lid rings 20' with a tear-off foil 25 attached thereon with a tear-off tab 29, the tear-off tab is fixed, in folded back position, on the tear-off foil of the lid. For this, an adhesive patch is applied onto the foil section sealed on the lid ring in such a way that individual adhesive patches are isolated from an adhesive tape with a carrier tape and adhesive material arranged thereon by means of a separating means. Such an adhesive patch is arranged on the foil section of each lid in the position where the folded back tear-off tab comes to lie. By this, a fixation of the tear-off tab can be reached in an economical and secure way.

The invention claimed is:

1. Apparatus for the manufacturing of tear-off lids (28), comprising a transport device for lid parts and lids (20, 20', 28) and processing stations for the lid parts and lids arranged along the transport device, including a sealing station (5, 6) adapted to seal a foil section (25) provided with a tear-off tab (29) onto a lid part shaped as lid ring (20'), as well as including a folding station (7) wherein the tear-off tab (29) is folded towards the top side of the foil section, characterized in that a station for adhesive bonding (40) is provided between the sealing station and the folding station, including an application device (41) by means of which an adhesive tape (48) is transported and an adhesive patch (30) is removed from a carrier tape (58) of said adhesive tape without cutting said carrier tape, and is applied in the station for adhesive bonding onto the top side (26) of the foil section previously sealed onto the lid ring in the sealing station, in a position where the tear-off tab will become to lie in the folding station.

2. Apparatus according to claim 1, characterized in that the application device (41) includes a separating means (45) which is arranged and formed in such a way that individual adhesive patches (30) which are substantially separated from one another can be formed from an adhesive material arranged continuously on the carrier tape of the adhesive tape.

3. Apparatus according to claim 2, characterized in that the separating means comprises a separating blade which is controllably deflectable towards a pressure plate, and a travel path for the adhesive tape is provided by said application device (41) between the separating blade and the pressure plate.

4. Apparatus according to claim 3, characterized in that the separating means is heatable.

5. Apparatus according to claim 1, characterized in that the application device (41) includes a holder for an adhesive tape roll and a deflecting roller arranged in order to rest on the circumferential, side of the adhesive tape roll.

6. Apparatus according to claim 1, characterized in that the application device (41) has an actuation means for the transport of the adhesive tape, which is arranged in such a way that it acts only upon the carrier tape of the adhesive tape after the removal of the adhesive patches.

7. Apparatus according to claim 1, characterized in that the application device (41) comprises detection means for detecting the end of the adhesive tape and/or a rupture of the adhesive tape as well as braking means for the free end section of the adhesive tape.

8. Apparatus for the manufacturing of tear-off lids (28), comprising a transport device for lid parts and lids (20, 20', 28) and processing stations for the lid parts and lids arranged along the transport device, including a sealing station (5, 6) adapted to seal a foil section (25) provided with a tear-off tab (29) onto a lid part shaped as lid ring (20'), as well as including a folding station (7) wherein the tear-off tab (29) is folded towards the top side of the foil section, characterized in that a station for adhesive bonding (40) is provided between the sealing station and the folding station, including an application device (41) by means of which an adhesive tape (48) is transported and an adhesive patch. (30) is removed from a carrier tape (58) of said adhesive tape without cutting said carrier tape, and is applied in the station for adhesive bonding onto the top side (26) of the foil section previously sealed onto the lid ring in the sealing station, in a position where the tear-off tab will become to lie in the folding station, and in that the application device (41) provides a deflector (57) for the transported adhesive tape which is arranged after the separating means in transport direction and which deflects the adhesive tape, and in that the station for adhesive bonding is formed in such a way that the respective lid to be provided with the adhesive patch is movable towards and pushable onto the deflector.

9. Method for manufacturing tear-off lids (28), comprising the steps of
   supplying a web (35) of tear-off foil material;
   punching out a foil section (25) with a tear-off tab (29) from the web (35);
   sealing the foil section (25) onto a lid ring (20'); and
   folding back the tear-off tab (29) onto the lid (28), characterized by the steps of
   separating an adhesive patch (30) from a carrier tape (58) of an adhesive tape (48), without cutting said carrier tape; and, then,
   applying the adhesive patch (30) onto the sealed foil section in a position where the folded back tear-off tab (29) comes to lie on the tear-off lid (28).

10. Method according to claim 9, characterized in that the adhesive patch (30) is separated by means of a separating means which separates the adhesive material of the adhesive tape and leaves the carrier tape of the adhesive tape intact.

11. Method according to claim 9, characterized in that the adhesive tape is taken off from an adhesive tape roll and transported stepwise, wherein the adhesive tape is deflected along the transport path after the separation of the adhesive patches from each other and in that art adhesive patch is applied onto the foil section after the deflection by moving the lid towards the deflecting position and pressing it against the adhesive tape patch.

* * * * *

UNITED STATES PATENT AND TRADEMARK OFFICE
CERTIFICATE OF CORRECTION

PATENT NO.         : 9,308,712 B2
APPLICATION NO.    : 14/007027
DATED              : April 12, 2016
INVENTOR(S)        : Andreas Lanz et al.

It is certified that error appears in the above-identified patent and that said Letters Patent is hereby corrected as shown below:

In the claims,

In Claim 5, Column 10, line 60, after the word circumferential, please delete ",".

In Claim 11, Column 12, line 23, please delete "art" and insert --an--.

Signed and Sealed this
Fifth Day of July, 2016

Michelle K. Lee
*Director of the United States Patent and Trademark Office*